(12) United States Patent
Wang et al.

(10) Patent No.: US 11,888,134 B2
(45) Date of Patent: Jan. 30, 2024

(54) BATTERY PACK AND VEHICLE COMPRISING THE BATTERY PACK

(71) Applicant: NIO TECHNOLOGY (ANHUI) CO., LTD, Hefei (CN)

(72) Inventors: Xianpeng Wang, Shanghai (CN); Yaping Jiang, Shanghai (CN); Feng Li, Shanghai (CN); Linfeng Wang, Shanghai (CN); Lide Zhu, Shanghai (CN); Jie Fang, Shanghai (CN); Shizhe Tzeng, Shanghai (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 303 days.

(21) Appl. No.: 17/223,542

(22) Filed: Apr. 6, 2021

(65) Prior Publication Data

US 2022/0190402 A1 Jun. 16, 2022

(30) Foreign Application Priority Data

Dec. 10, 2020 (CN) .......................... 202011454326.3

(51) Int. Cl.
| | |
|---|---|
| *H01M 10/653* | (2014.01) |
| *H01M 10/625* | (2014.01) |
| *H01M 10/6556* | (2014.01) |
| *H01M 10/6572* | (2014.01) |
| *H01M 10/658* | (2014.01) |
| *H01M 50/249* | (2021.01) |
| *H01M 50/209* | (2021.01) |
| *H01M 50/242* | (2021.01) |

(52) U.S. Cl.
CPC ....... *H01M 10/653* (2015.04); *H01M 10/625* (2015.04); *H01M 10/658* (2015.04); *H01M 10/6556* (2015.04); *H01M 10/6572* (2015.04); *H01M 50/209* (2021.01); *H01M 50/242* (2021.01); *H01M 50/249* (2021.01)

(58) Field of Classification Search
CPC ............. H01M 10/653; H01M 10/625; H01M 10/6556; H01M 10/6572; H01M 10/658; H01M 50/249; H01M 50/209; H01M 50/242

See application file for complete search history.

(56) References Cited

U.S. PATENT DOCUMENTS

| | | | | |
|---|---|---|---|---|
| 2018/0305791 | A1* | 10/2018 | Ye | ........................ H01M 4/808 |
| 2021/0336303 | A1* | 10/2021 | Aykol | ....................... C09K 5/06 |

FOREIGN PATENT DOCUMENTS

DE 102016224277 A1 * 6/2018 .............. B60L 50/64

* cited by examiner

*Primary Examiner* — Karie O'Neill Apicella
(74) *Attorney, Agent, or Firm* — Sheridan Ross P.C.

(57) ABSTRACT

The disclosure relates to the technical field of traction batteries, and in particular to a battery pack and a vehicle comprising the battery pack. The invention aims at the problem of large heat loss in the existing traction battery in a low-temperature environment. To this end, the battery pack of the disclosure comprises: a frame internally formed with an installation site; a battery module mounted in the installation site and comprising a number of cells; and a side beam connected to an outer side wall of the frame and made of a first thermal insulation material. The above arrangement can reduce the heat transfer coefficient of natural convection between the side wall of the frame and the environment, and reduce the heat flux, thereby reducing the temperature loss of the cells.

19 Claims, 4 Drawing Sheets

BATTERY PACK AND VEHICLE COMPRISING THE BATTERY PACK

CROSS-REFERENCE TO RELATED APPLICATION

This application claims the benefit of China Patent Application No. 202011454326.3 filed Dec. 10, 2020, the entire contents of which are incorporated herein by reference.

TECHNICAL FIELD

The disclosure relates to the technical field of traction batteries, and in particular to a battery pack and a vehicle comprising the battery pack.

BACKGROUND ART

With the increase in the market share of new energy vehicles, especially battery electric vehicles, the use of battery electric vehicles in the cold northern environment is becoming more and more popular. When a vehicle is left to stand for a long time in a cold environment, whether the internal cell temperature of a traction battery, which is a core component of an electric vehicle, can be maintained in an ideal temperature range will directly affect the chemical activity and service life of the traction battery.

Generally, in order to ensure the overall structural strength of the traction battery, an outer casing of the traction battery is made of a metal material, in this way, however, in a low-temperature environment, it is easier for the metal material to exchange heat with the external environment, which causes the cell temperature to drop too quickly. In order to solve the above-mentioned problems, some manufacturers have provided traction batteries with an active heating function. When the battery temperature drops to a certain threshold, the traction battery is actively heated. However, this method requires frequent or long-term activation of the heater to keep the battery warm, which is not only inefficient, but also consumes a lot of power from the traction battery and sacrifices a lot of cruising range.

Accordingly, there is a need in the art for a new battery pack and a vehicle comprising the battery pack to solve the above-mentioned problems.

SUMMARY OF THE INVENTION

In order to solve at least one of the above problems in the prior art, that is, to solve the problem of large heat loss of the existing traction battery in a low-temperature environment, the disclosure provides a battery pack comprising: a frame internally formed with an installation site; a battery module mounted in the installation site and the battery module comprises a number of cells; and a side beam connected to an outer side wall of the frame and made of a first thermal insulation material.

In a preferred technical solution of the battery pack as described above, the first thermal insulation material is a microcellular expanded composite material.

In a preferred technical solution of the battery pack as described above, the microcellular expanded composite material is microcellular expanded polypropylene or microcellular expanded nylon.

In a preferred technical solution of the battery pack as described above, there are two side beams, which are connected to two side walls of the frame respectively in a length direction of the frame.

In a preferred technical solution of the battery pack as described above, the interior of the side beam is filled with an energy-absorbing material.

In a preferred technical solution of the battery pack as described above, the interior of the side beam is formed with a plurality of rib plates, which divide the interior of the side beam into a plurality of installation chambers opening toward the frame, and the energy-absorbing material is filled in the plurality of installation chambers.

In a preferred technical solution of the battery pack as described above, the energy-absorbing material is expanded polypropylene or ethylene-vinyl acetate copolymer.

In a preferred technical solution of the battery pack as described above, the outer side wall of the frame is provided with a lug for connecting to a vehicle, the interior of the side beam is formed with an enveloping chamber opening toward the frame, and the lug is accommodated in the enveloping chamber in a connected state.

In a preferred technical solution of the battery pack as described above, the outer side wall of the frame is formed with a plurality of reinforcing ribs, a plurality of filling spaces are formed between the plurality of reinforcing ribs, and each of the filling space is filled with a second thermal insulation material.

In a preferred technical solution of the battery pack as described above, the second thermal insulation material is an expanded thermal insulation material.

In a preferred technical solution of the battery pack as described above, the expanded thermal insulation material is silicone foam, polyurethane sponge or polyvinyl chloride expanded plastic.

In a preferred technical solution of the battery pack as described above, the frame is a hollow structure and is formed with a cavity, and the cavity is filled with a phase-change material.

In a preferred technical solution of the battery pack as described above, the phase-change material is an inorganic phase-change material, an organic phase-change material or a composite phase-change material.

In a preferred technical solution of the battery pack as described above, the battery pack further comprises an active thermal compensation assembly, which is provided on a heat dissipation path of the battery module and is configured to be able to heat the cells.

In a preferred technical solution of the battery pack as described above, the active thermal compensation assembly is connected to a battery management system.

In a preferred technical solution of the battery pack as described above, the frame comprises an outer frame and an inner frame, the plurality of installation sites are formed in an enclosed manner between the outer frame and the inner frame, and the active thermal compensation assembly is provided on an inner side wall of the outer frame.

In a preferred technical solution of the battery pack as described above, the active thermal compensation assembly is an electric heater, a graphene heat radiation sheet or a thermoelectric cooler.

In a preferred technical solution of the battery pack as described above, the battery pack further comprises a temperature equalizing assembly, which is arranged in the frame and is configured to be able to balance the temperature between different cells.

In a preferred technical solution of the battery pack as described above, the temperature equalizing assembly is attached to the outer side wall of the battery module close to an outer periphery of the frame.

In a preferred technical solution of the battery pack as described above, the temperature equalizing assembly is a heat pipe group, a thermal conductive aluminum plate group or a thermal conductive silicon pad group.

The present application further provides a vehicle comprising a battery pack according to any one of the above preferable technical solutions.

It can be understood by those skilled in the art that in a preferred technical solution of the disclosure, a battery pack comprises: a frame internally formed with an installation site; a battery module mounted in the installation site and comprising a number of cells; and a side beam connected to an outer side wall of the frame and made of a first thermal insulation material.

The above arrangement can reduce the heat transfer coefficient of natural convection between the side wall of the frame and the environment, and reduce the heat flux, thereby reducing the temperature loss of the cells. Specifically, the side beam is connected to the outer side wall of the frame and the side beam is made of the first thermal insulation material, such that the side beam and the frame can perform heat exchange at a lower heat transfer rate during normal use of the battery pack. That is, in low-temperature conditions, the speed of heat transferred to the side beam through the connection between the frame and the side beam can be reduced, and the speed of heat transfer and heat radiation from the side beam to the outside air is also reduced. As a result, loss of heat is reduced, and the temperature of the cells is maintained at a rational value for a long time, and the performance of the battery pack in the low-temperature conditions is ensured.

Further, the interior of the side beam is filled with the energy-absorbing material, such that when the vehicle collides, part of the energy generated by the collision can be absorbed by the energy-absorbing material in the side beam, thereby reducing the impact of the collision on the battery pack and improving the safety of the battery pack.

Further, the enveloping chamber is formed in the side beam, and the enveloping chamber envelops the lug provided on the outer side wall of the frame, so that the heat loss through the lug can be further reduced.

Further, the plurality of reinforcing ribs are formed on the outer side wall of the frame, the filling spaces are formed between the reinforcing ribs, and the filling spaces are then filled with the second thermal insulation material, such that the reinforcing ribs have the function of increasing the structural strength, and the filling space formed between the reinforcing ribs can also exert sufficient heat loss prevention ability through the filled expanded thermal insulation material. Therefore, when the battery pack is left to stand in a cold environment, the heat flux around the frame is significantly reduced, and the temperature of the cells is significantly increased compared to a conventionally designed battery pack.

Further, the hollow structure of the frame is filled with the phase-change material, such that when the temperature of the cells decreases to a certain level, the phase-change material works and releases latent heat, which slows the rate of heat dissipation from the battery to the outside and prolongs the heat preservation time.

Further, the active thermal compensation assembly is provided on the heat dissipation path of the battery module, such that when the temperature of the cells decreases, only a small amount of heat source needs to be applied to a specific heat transfer path to compensate for the heat lost to the air, thereby prolonging the heat preservation time of the cells. Compared with the heating function of the existing battery pack, this arrangement can reduce battery power consumption and reduce the impact of active thermal compensation on the cruising range.

Further, the temperature equalizing assembly is provided in the frame, and a heat transfer channel can be created between a cell with a higher temperature and a cell with a lower temperature inside the battery pack, such that the temperature difference between the cells in the battery pack is reduced, the temperature uniformity of the battery pack is improved, and the shortest stave effect is alleviated.

Another aspect of the disclosure also provides a vehicle, and the above-mentioned battery pack is mounted on the vehicle, such that when the vehicle is left to stand in a cold environment, the battery pack can be kept warm for a long enough time with little power consumption or even without consuming its own power, ensuring that the performance of the battery pack will not be affected after being placed outdoors for a long time.

Solution 1: A battery pack, comprising:
a frame internally formed with an installation site;
a battery module mounted in the installation site and comprising a number of cells; and
a side beam connected to an outer side wall of the frame and made of a first thermal insulation material.

Solution 2: the battery pack according to Solution 1, wherein the first thermal insulation material is a microcellular expanded composite material.

Solution 3: the battery pack according to Solution 2, wherein the microcellular expanded composite material is microcellular expanded polypropylene or microcellular expanded nylon.

Solution 4: the battery pack according to Solution 1, wherein there are two side beams, which are connected to two side walls of the frame respectively in a length direction of the frame.

Solution 5: the battery pack according to Solution 1, wherein the interior of the side beam is filled with an energy-absorbing material.

Solution 6: the battery pack according to Solution 5, wherein the interior of the side beam is formed with a plurality of rib plates, which divide the interior of the side beam into a plurality of installation chambers opening toward the frame, and the energy-absorbing material is filled in the plurality of installation chambers.

Solution 7: the battery pack according to Solution 5, wherein the energy-absorbing material is expanded polypropylene or ethylene-vinyl acetate copolymer.

Solution 8: the battery pack according to Solution 1, wherein the outer side wall of the frame is provided with a lug for connecting to a vehicle, the interior of the side beam is formed with an enveloping chamber opening toward the frame, and the lug is accommodated in the enveloping chamber in a connected state.

Solution 9: the battery pack according to Solution 1, wherein the outer side wall of the frame is formed with a plurality of reinforcing ribs, a plurality of filling spaces are formed between the plurality of reinforcing ribs, and each of the filling space is filled with a second thermal insulation material.

Solution 10: the battery pack according to Solution 9, wherein the second thermal insulation material is an expanded thermal insulation material.

Solution 11: the battery pack according to Solution 10, wherein the expanded thermal insulation material is silicone foam, polyurethane sponge or polyvinyl chloride expanded plastic.

Solution 12: the battery pack according to Solution 1, wherein the frame is a hollow structure and is formed with a cavity, and the cavity is filled with a phase-change material.

Solution 13: the battery pack according to Solution 12, wherein the phase-change material is an inorganic phase-change material, an organic phase-change material or a composite phase-change material.

Solution 14: the battery pack according to Solution 1, wherein the battery pack further comprises an active thermal compensation assembly, which is provided on a heat dissipation path of the battery module and is configured to be able to heat the cells.

Solution 15: the battery pack according to Solution 14, wherein the active thermal compensation assembly is connected to a battery management system.

Solution 16: the battery pack according to Solution 14, wherein the frame comprises an outer frame and an inner frame, the plurality of installation sites are formed in an enclosed manner between the outer frame and the inner frame, and the active thermal compensation assembly is provided on an inner side wall of the outer frame.

Solution 17: the battery pack according to Solution 14, wherein the active thermal compensation assembly is an electric heater, a graphene heat radiation sheet or a thermoelectric cooler.

Solution 18: the battery pack according to Solution 1, wherein the battery pack further comprises a temperature equalizing assembly, which is arranged in the frame and is configured to be able to balance the temperature between different cells.

Solution 19: the battery pack according to Solution 18, wherein the temperature equalizing assembly is attached to the outer side wall of the battery module close to an outer periphery of the frame.

Solution 20: the battery pack according to Solution 18, wherein the temperature equalizing assembly is a heat pipe group, an aluminum plate group or a thermal conductive silicon pad group.

Solution 21: a vehicle, comprising a battery pack according to any one of Solutions 1 to 20.

BRIEF DESCRIPTION OF THE DRAWINGS

The battery pack of the disclosure and the vehicle comprising the battery pack will be described below with reference to the drawings and in conjunction with a battery electric vehicle. In the accompanying drawings.

LIST OF REFERENCE NUMERALS

Figure 1:
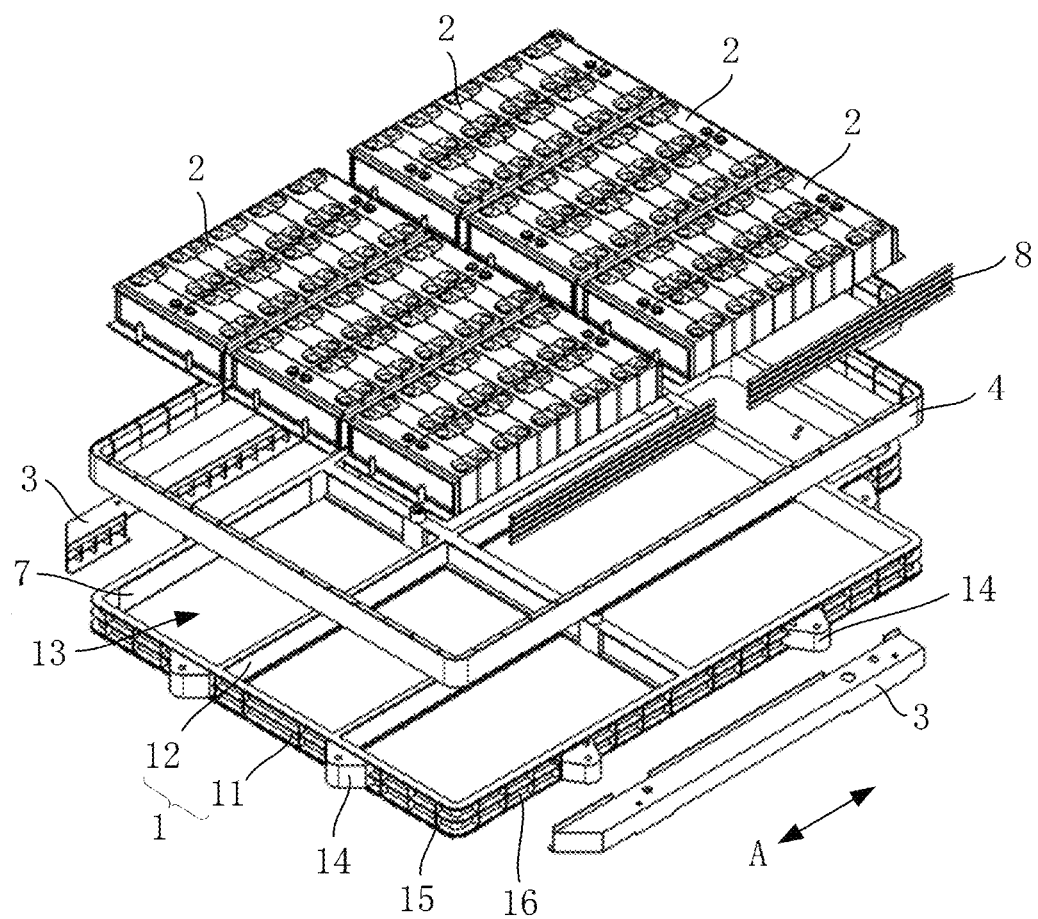
FIG. 1 is an exploded view of a battery pack of the disclosure.

1: Frame; 11: Outer frame; 12: Inner frame; 13: Installation site; 14: Lug; 15: Reinforcing rib; 16: Filling space; 17: Cavity; 2: Battery module; 21: Cell; 3: Side beam; 31: Rib plate; 32: Installation chamber; 33: Enveloping chamber; 34: Through hole; 4: Second thermal insulation material; 5: Energy-absorbing material; 6: Phase-change material; 7: Thermal compensation assembly; 8: Temperature equalizing assembly.

DETAILED DESCRIPTION OF EMBODIMENTS

Preferred embodiments of the disclosure are described below with reference to the drawings. It should be understood by those skilled in the art that these embodiments are only for explaining the technical principles of the disclosure and are not intended to limit the scope of protection of the disclosure. For example, although this embodiment is described in conjunction with a battery electric vehicle, it is not intended to limit the scope of protection of the disclosure. Without departing from the principles of the disclosure, those skilled in the art can apply the battery pack of the disclosure to other application scenarios. For example, the battery pack of the disclosure may also be applied to hybrid vehicles, electric bicycles, electric motorcycles, and so on.

It should be noted that in the description of the disclosure, the terms, such as "center", "upper", "lower", "left", "right", "vertical", "horizontal", "inner" and "outer", that indicate directions or positional relationships are based on the directions or positional relationships shown in the drawings only for convenience of description, and do not indicate or imply that the device or element must have a specific orientation, be constructed and operated in a specific orientation, and therefore cannot be understood as limitation to the disclosure. In addition, the terms "first", "second" and "third" are for descriptive purposes only and should not be construed as indicating or implying relative importance.

In addition, it should also be noted that, in the description of the disclosure, the terms "mount", "engage" and "connect" should be interpreted in a broad sense unless explicitly defined and limited otherwise, which, for example, may mean a fixed connection, a detachable connection or an integral connection; may mean a mechanical connection or an electrical connection; and may mean a direct connection, an indirect connection by means of an intermediary, or internal communication between two elements. For those skilled in the art, the specific meaning of the above-mentioned terms in the disclosure can be interpreted according to the specific situation.

First, referring to FIG. 1, a first embodiment of a battery pack of the disclosure will be described. FIG. 1 is an exploded view of the battery pack of the disclosure.

As shown in FIG. 1, in order to solve the problem of large heat loss of existing traction batteries in a low-temperature environment, the disclosure provides a battery pack comprising a frame 1, a number of battery modules 2 and two side beams 3. A number of installation sites 13 are formed in the frame 1, and each battery module 2 is installed in one of the installation sites 13. Each battery module 2 comprises a plurality of cells 21(see FIG. 6), and the plurality of cells 21 are connected in series and/or in parallel. The two side beams 3 are connected to two outer side walls of the frame 1 respectively, and the side beams 3 are made of a first thermal insulation material.

The above arrangement can reduce the heat transfer coefficient of natural convection between the side walls of the frame 1 and the environment, and reduce the heat flux, thereby reducing the temperature loss of the cells 21. Specifically, the side beams 3 are connected to the outer side walls of the frame 1 and the side beams 3 are made of the first thermal insulation material, such that the side beams 3 and the frame 1 can perform heat exchange at a lower heat transfer rate during normal use of the battery pack. That is, in low-temperature conditions, the speed of heat transferred to the side beam 3 through the connection between the frame 1 and the side beam 3 can be reduced, and the speed of heat transfer and heat radiation from the side beam 3 to the outside air is also reduced. As a result, loss of heat is reduced, and the temperature of the cells 21 is maintained at a rational value for a long time, and the performance of the battery pack in the low-temperature conditions is ensured.

It can be understood by those skilled in the art that, although the above embodiment only introduces that the battery pack comprises the frame 1, the battery module 2 and the side beams 3, it is obvious that they are not all the components of the battery pack. Generally, the battery pack may further comprise one or more of a housing, an upper cover plate, a lower cover plate, a cooling plate, a battery management system (BMS), etc., and these structures are not shown in the drawings in order to unnecessarily obscure the examples of the present disclosure.

Figure 2:
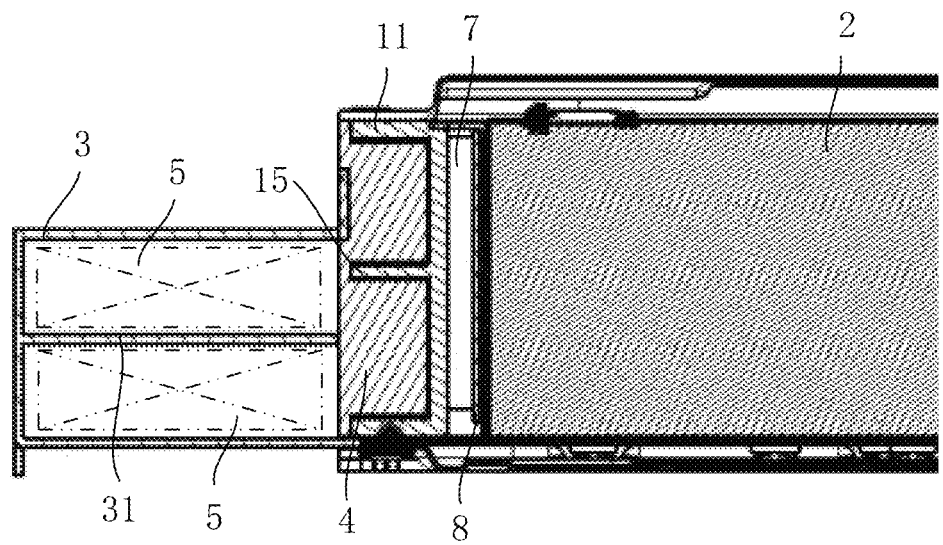
FIG. 2 is a partial sectional view of the battery pack of the disclosure.
Figure 3:
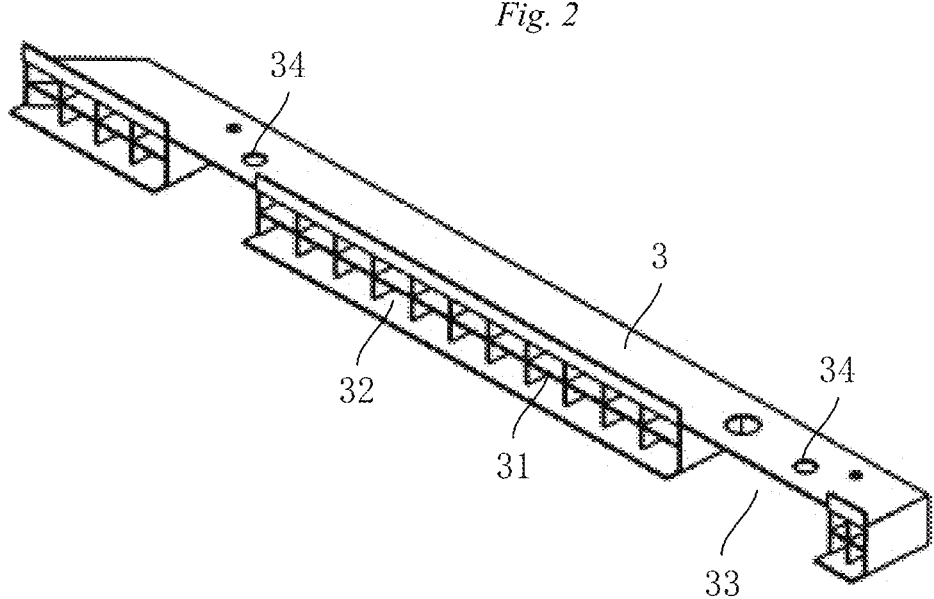
FIG. 3 is a structural diagram of a side beam of the battery pack of the disclosure.
Figure 4:
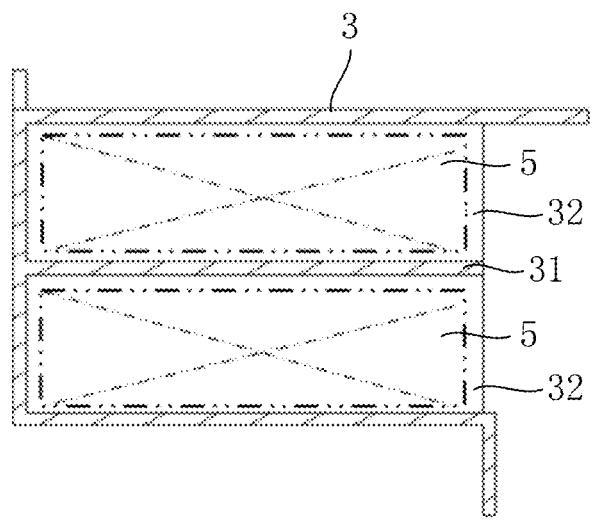
FIG. 4 is a sectional view of the side beam of the battery pack of the disclosure.
Figure 5:
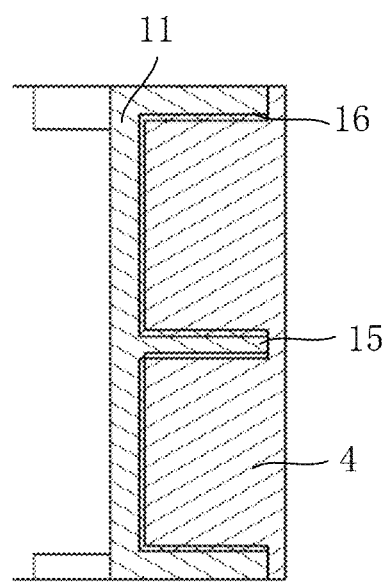
FIG. 5 is a sectional view of a first embodiment of an outer frame of the disclosure.
Figure 6:
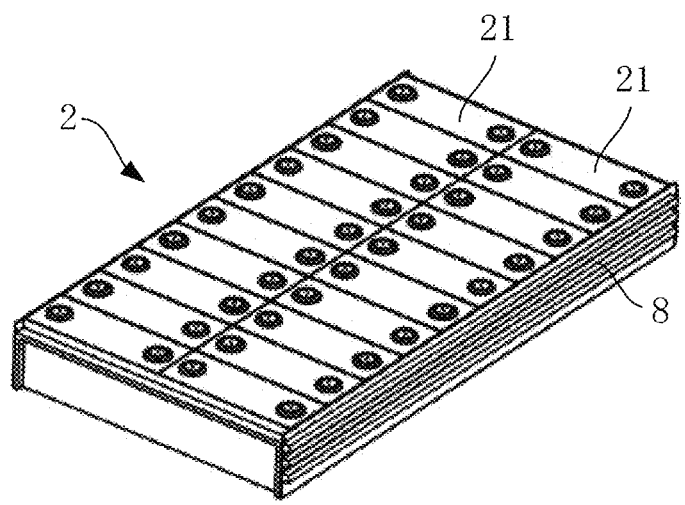
FIG. 6 is a diagram of an installation position of a temperature equalizing assembly in a battery module of the disclosure.

Hereinafter, further referring to FIGS. 1 to 6, the battery pack of this embodiment will be described in detail. In the figures, FIG. 2 is a partial sectional view of the battery pack of the disclosure; FIG. 3 is a structural diagram of the side beam of the battery pack of the disclosure; FIG. 4 is a sectional view of the side beam of the battery pack of the disclosure; FIG. 5 is a sectional view of a first embodiment of an outer frame of the disclosure; and FIG. 6 is a diagram of an installation position of a temperature equalizing assembly in the battery module of the disclosure.

As shown in FIG. 1, in a possible embodiment, the frame 1 is made of a metal material, for example is cast from an aluminum alloy or stainless steel. The frame comprises an outer frame 11 and inner frame 12, the outer frame 11 generally has a "convex" shape, and six rectangular installation sites 13 are formed between the outer frame 11 and the inner frame 12. Accordingly, there are six battery modules 2, the outer periphery of the battery modules 2 is shaped to adapt to the installation sites 13, and each battery module 2 is fixedly embedded in one of the installation sites 13. The outer side wall of the outer frame 11 is integrally formed with a plurality of lugs 14, and each lug 14 is provided with a connection hole. After the battery pack is assembled, the lugs 14 can be fixedly connected to a chassis of the battery electric vehicle (or hereinafter called electric vehicle or vehicle) through a connectors such as screws and pins, so that the battery pack is fixed on the battery electric vehicle and provides the vehicle with energy.

Still referring to FIG. 1, in this embodiment, there are two side beams 3, and the two side beams 3 are connected to two side walls of the outer frame 11 respectively in a length direction of the frame 1 (i.e. the direction A in FIG. 1). Specifically, referring to FIGS. 2 to 4, the side beam 3 is in the shape of a long strip as a whole, and is connected to the outer frame 11 by means of riveting. The side beam 3 as a whole is integrally molded from a first thermal insulation material, which is preferably a microcellular expanded composite material, such as a microcellular expanded polypropylene material. After being molded, the side of the side beam 3 facing the outer frame 11 is an opening side, and a plurality of rib plates 31 are formed in the opening. The plurality of rib plates 31 divide the inside of the side beam 3 to a plurality of installation chambers 32, and each installation chamber 32 is filled with an energy-absorbing material 5. The energy-absorbing material 5 is preferably expanded polypropylene (EPP). An enveloping chamber 33 is also formed inside the opening. In a riveted state, the lug 14 is accommodated in the enveloping chamber 33. The side beam 3 is provided with a through hole 34 at the position corresponding to the connection hole in the lug 14, so that the connector can pass through the through hole 34 and fix the lug 14 to the chassis of the vehicle.

Referring to FIGS. 1, 2 and 5, the outer side wall of the outer frame 11 is formed with a plurality of horizontal and vertical reinforcing ribs 15, a plurality of filling spaces 16 are formed between the plurality of reinforcing ribs 15, and each filling space 16 is filled with a second thermal insulation material 4. The second thermal insulation material 4 is preferably an expanded thermal insulation material, such as silicone foam, polyurethane sponge (also called PU foam) or polyvinyl chloride expanded plastic (also called expanded PVC). The depth and the surface area of the filling space 16 are calculated such that the filled thermal insulation material can exert sufficient thermal insulation ability. Since the frame 1 itself has the requirements for load-bearing mechanical properties and at the same time needs to have the ability to insulate and preserve heat, the larger the filling space 16 means the more second thermal insulation materials 4 that can be filled, the better the heat preservation performance, and therefore the worse the structural performance. Therefore, the way in which the filling space 16 is calculated should be to maximize the filling space 16 while ensuring the structural strength. As an example, three parameters, namely the bottom surface area of the filling space 16, the thickness of the reinforcing ribs 15, and the thickness of a base material of the outer frame 11, are taken and are simulated sequentially through an orthogonal analysis method. On the basis of qualified simulation of the mechanical structure performance, simulation of heat preservation and heat dissipation is carried out. The parameter configuration with the best heat preservation performance is the best solution.

Continuing to refer to FIGS. 1 and 2, the battery pack further comprises an active thermal compensation assembly 7, the active thermal compensation assembly 7 is provided on a heat dissipation path of the battery module 2, and the active thermal compensation assembly 7 is configured to be able to heat the cells 21. Specifically, the active thermal compensation assembly 7 may be an electric heater (such as a resistance heater, an electromagnetic heater, a short-wave heater, etc.), or may be a graphene heat radiation sheet, or may be an electrical element utilizing the Peltier effect, such as a thermoelectric cooler. The arrangement position of the active thermal compensation assembly 7 is determined based on quantitative analysis of a heat transfer path. As an example, based on thermal simulation heat dissipation model, a heat transfer interface of each assembly (such as the environment and the housing, the cooling plate and the frame 1, the upper cover and housing, the cell 21 and glue, etc.) is extracted to build a thermal simulation model to calculate the heat flux of each assembly in several hours, and then based on the above-mentioned calculation data, a data analysis model is established to find out a heat transfer sensitive path, that is, one or more optimal arrangement positions of the active thermal compensation assembly 7 are determined. In this embodiment, as shown in FIG. 1, two inner side walls of the outer frame 11 in the length direction are taken as the optimal arrangement positions, and the active thermal compensation assembly 7 is attached to the inner side wall or is embedded in the inner side wall.

In addition, in a possible application scenario, the active thermal compensation assembly 7 is connected to a battery management system (BMS), and is controlled by the battery management system. When the temperature of the cells 21 drops to a certain temperature threshold, the battery management system determines optimal working time and power of the active thermal compensation assembly 7 (that is, power and working time of the assembly) according to the state of the cells 21 and a standing time of the battery pack, and then controls, according to the above-mentioned parameters, the actuation of the active thermal compensation assembly 7 to heat the cells 21. The power of active thermal compensation should be determined based on a heat preservation target (for example, after heat preservation for 12 h, the temperature is higher than or equal to 0° C.). The determination method may be roughly determining multiple sets of power and working time parameters based on the heat capacity of the cells 21, the temperature threshold and the heat preservation target, and then multiple sets of parameters are taken to respectively undergo thermal simulation, finally the most energy-saving power and working time under the heat preservation target are determined.

Referring to FIGS. 1, 2 and 6, the battery pack further comprises a temperature equalizing assembly 8, the temperature equalizing assembly 8 is arranged in the frame 1, and the temperature equalizing assembly 8 is configured to be able to balance the temperature between different cells 21. Specifically, the temperature equalizing assembly 8 preferably uses heat pipe groups, each heat pipe group comprises a plurality of heat pipes, and the heat pipe groups are attached to outer side walls of some of the battery modules 2 close to the outer frame 11. As an example, as shown in FIG. 1, two heat pipe groups respectively attached to the outer side walls of two battery modules 2 arranged in the length direction of the frame 1 and close to a long-side outer side wall of the outer frame 11, and the length of each heat pipe group is substantially equal to that of the side wall of the battery module 2.

The above arrangement has the following advantages:

The frame 1 is made of a metal material, and the plurality of reinforcing ribs 15 are provided on the outer side wall of the frame 1, and the filling spaces 16 are formed between the reinforcing ribs 15. The filling space 16 is filled with an expanded thermal insulation material, and then the side beam 3 is made of a microcellular expanded composite material. The installation chamber 32 and the enveloping chamber 33 are formed in the side beam 3, and the installation chamber 32 is filled with the energy-absorbing material 5. The enveloping chamber 33 envelops the lug 14, and the battery pack of this application can take into account both the effects of structural strength and thermal insulation.

First of all, the provision of the reinforcing ribs 15 has the effect of increasing the structural strength, and the filling spaces 16 formed between the reinforcing ribs 15 can also exert sufficient heat loss prevention ability through the filled expanded thermal insulation material. Therefore, when the battery pack is left to stand in a cold environment, the heat flux around the frame 1 is significantly reduced, and the temperature of the cells 21 is significantly increased compared to a conventionally designed battery pack. Secondly, the side beam 3 is made of the microcellular expanded composite material, such that the side beam 3 and the frame 1 perform heat exchange at a lower heat transfer rate. That is, in low-temperature conditions, the speed of heat transferred to the side beam 3 through the connection between the frame 1 and the side beam 3 can be reduced, and the speed of heat transfer and heat radiation from the side beam 3 to the outside air is also reduced. As a result, loss of heat is reduced, and the temperature of the cells 21 is maintained at a rational value for a long time, and the performance of the battery pack in the low-temperature conditions is ensured. Next, the interior of the side beam 3 is filled with the expanded polypropylene (EPP), such that when the vehicle collides, part of the energy generated by the collision can be absorbed by the expanded polypropylene in the side beam 3, thereby reducing the impact of the collision on the battery pack and improving the safety of the battery pack. Finally, the enveloping chamber 33 is formed in the side beam 3, and the enveloping chamber 33 envelops the lug 14 provided on the outer side wall of the frame 1, such that the heat loss through the lug 14 can also be reduced, and the heat loss of the battery pack can be further reduced.

Further, the cooling of the battery pack presents a specific temperature distribution trend, such as being cold at the periphery and hot in the middle, and therefore, the cells 21 at the periphery become the "shortest stave" that limits the performance of the entire vehicle. In this application, by attaching the heat pipe group between the outer side wall of the battery module 2 and the outer frame 11, a heat transfer channel can be created between a cell 21 with a higher temperature and a cell 21 with a lower temperature inside the battery pack. The heat from the cell 21 in the middle is transferred to the cells 21 at the periphery in a timely manner, such that the temperature difference between the cells 21 in the battery pack is reduced, the temperature uniformity of the battery pack is improved, and the shortest stave effect is alleviated.

Further, the active thermal compensation assembly 7 is provided on the heat dissipation path of the battery module 2, and the active thermal compensation assembly 7 is provided on the heat transfer sensitive path, such that when the temperature of the cells 21 decreases, only a small amount of heat source needs to be applied to a specific heat transfer path to compensate for the heat lost to the air, thereby prolonging the heat preservation time of the cells 21. Compared with the heating function of the existing battery pack, this arrangement can reduce battery power consumption and reduce the impact of active thermal compensation on the cruising range. In particular, when heat preservation methods such as the active thermal compensation assembly 7 and the outer side wall of the frame 1 being filled with the expanded thermal insulation material, the side beam 3 being made of the microcellular expanded composite material, the interior of the side beam being filled with the expanded polypropylene, the side beam 3 enveloping the lug 14, and heat pipes being attached to the outer side wall of the battery module 2 are used in combination, the battery energy consumption can be significantly reduced and the heating effect can be improved.

Figure 7:
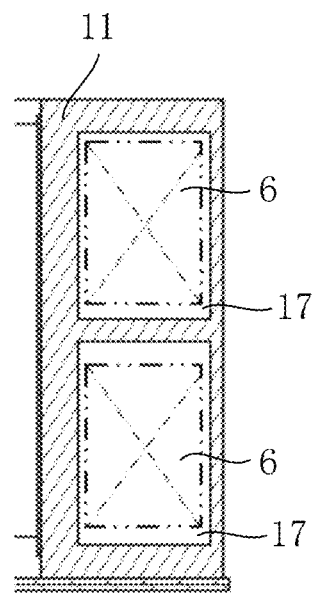
FIG. 7 is a sectional view of a second embodiment of an outer frame of the disclosure.

Hereinafter, referring to FIG. 7, a second embodiment of the disclosure will be briefly introduced. FIG. 7 is a sectional view of a second embodiment of an outer frame of the disclosure.

As shown in FIG. 7, the frame 1 is arranged as follows: The frame 1 is configured as a hollow structure and is formed with a cavity 17, and the cavity 17 is filled with a phase-change material 6. The frame 1 may be a casting or a profiled part, in the interior of which a closed or semi-closed cavity 17 is reserved as a space for being filled with the phase-change material 6. The phase-change material 6 may utilize an inorganic phase-change material (such as crystal hydrated salt, molten salt, and metal alloy), an organic phase-change material (such as paraffin, carboxylic acid, ester, and polyol) or a composite phase-change material (such as a mixture of an organic phase-change material and an inorganic phase-change material). The phase-change material 6 is a material having a specific phase-change latent heat and a phase-change temperature point obtained by calculation.

The characteristics of the phase-change material 6 include the phase-change latent heat and the temperature phase-change point. Among these two parameters, the phase-change temperature in particular is customized according to requirements. The placement area and amount of the phase-change material 6 may be obtained based on thermal simulation of the battery. By way of example, simulation software may be used to calculate the energy Q required to delay the time in which the temperature of a specific area in the battery pack decreases from 5° C. to 0° C. by a hours, and then based on the calculation result, the material with a phase-change temperature of about 5° C. and a phase-change latent heat greater than Q is selected as a qualified solution. In this way, when the temperature of the specific area in the battery pack drops to about 5° C., the phase-change material 6 works and releases latent heat.

The hollow structure of the frame 1 is filled with the phase-change material 6, such that when the temperature of the cells 21 decreases to a certain level, the phase-change material 6 works and releases latent heat, which slows the rate of heat dissipation from the battery to the outside and prolongs the heat preservation time.

It should be noted that although only two examples are provided for the battery pack here, this is not intended to limit the scope of protection of the disclosure. Those skilled in the art can adjust the above arrangements without deviating from the principle of the disclosure, so that the disclosure can be applied to more specific application scenarios.

As an example, in an alternative embodiment, although the first thermal insulation material is introduced in the form of the microcellular expanded composite material, such a thermal insulation material is not invariable. Under the condition that the strength and thermal insulation effect can be satisfied, those skilled in the art may also utilize another thermal insulation material for replacement. As an example, the first thermal insulation material may also be a material made through a supercritical extraction process, such as a composite material formed by a combination of one or more of aerogel, glass fiber, and polyester. Similarly, in addition to the microcellular expanded polypropylene introduced in the above embodiments, the microcellular expanded composite material may be a microcellular expanded nylon material, etc.

Likewise, the second thermal insulation material 4 may also be adjusted in other embodiments. For example, the second thermal insulation material may also be a material made through a supercritical extraction process, such as a composite material formed by a combination of one or more of aerogel, glass fiber, and polyester.

Likewise, the energy-absorbing material 5 may be adjusted in other embodiments. For example, the energy-absorbing material 5 may also be ethylene-vinyl acetate copolymer (EVA), etc.

As another example, in another alternative embodiment, although the above-mentioned temperature equalizing assembly is introduced with reference to the heat pipe group, this is not restrictive. In other embodiments, a thermal conductive aluminum plate group or a thermal conductive silicon pad group may also be used for replacement, and this replacement does not deviate from the principle of this application.

In other alternative embodiments, those skilled in the art can delete some of the features on the basis of this, in order to obtain technical solutions that meet other application scenarios by combining the features. As an example, those skilled in the art may omit one or more features of the rib plates 31, the lug 14, the reinforcing ribs 15, the energy-absorbing material 5, the second thermal insulation material 4, the active thermal compensation assembly 7 and the temperature equalizing assembly 8.

As another example, in an alternative embodiment, although the side beam 3 is connected to the outer frame 11 by means of riveting, this connection method is not unique. In other embodiments, the side beam 3 may also be fixedly connected to the outer frame 11 by means of welding, screwing, etc.

As another example, in another alternative embodiment, although the arrangement position and the number of each feature have been limited the above technical solutions, such an arrangement is not unique, and those skilled in the art may adjust the number and arrangement position thereof such that the adjusted technical solutions can be applied to more specific application scenarios. As an example, in addition to the six installation sites 13 for the battery modules 2, the outer frame 11 and the inner frame 12 may form any number of installation sites 13, such as one, two, three, or seven, as long as the number of the battery modules 2 is accordingly adjusted. As another example, the side beam 3 may be arranged around all the outer side walls of the frame 1, and may also be arranged at one outer side wall. As yet another example, the active thermal compensation assembly 7 may be attached to one or more of the four inner side walls of the outer frame 11, and may also be attached to the side wall of the inner frame 12. As still another example, the temperature equalizing assembly 8 may be arranged around the outer peripheral sides of all the battery modules 2 arranged facing the outer frame 11, and may also be arranged only on the outer side wall of some battery modules 2.

Of course, the above alternative embodiments, or the alternative embodiments and the preferable embodiments may be cross-used cooperatively, so as to obtain new embodiments that are suitable for more specific application scenarios by combining the above embodiments.

The disclosure further provides a vehicle, on which the battery pack described above is mounted. The vehicle is preferably a battery electric vehicle, and the battery pack is fixedly connected to a chassis of the vehicle.

The above-mentioned battery pack is mounted on the vehicle, such that when the vehicle is left to stand in a cold environment, the battery pack can be kept warm for a long enough time with little power consumption or even without consuming its own power, ensuring that the performance of the battery pack will not be affected after being placed outdoors for a long time. After repeated experiments, observations, analysis and comparisons, the inventors have found that when the electric vehicle equipped with the battery pack of this application is left to stand in a cold environment, the battery can be kept warm for a long enough (overnight) time without consuming its own power, ensuring that the performance (endurance/acceleration/maximum speed, etc.) of the car will not be affected after being left outdoors all night. Moreover, when the electric vehicle equipped with the battery pack of this application is left to stand in a cold environment for a long time (>1 day), the active thermal compensation assembly 7 can be actuated to slow down the heat loss of the battery, ensuring that the vehicle still has sufficient vehicle performance after being left to stand for a longer time.

Those skilled in the art should understand that although some examples as described herein comprise certain features included in other examples, instead of other features, the combination of the features of different examples means to be within the scope of the disclosure and form a different example. For example, in the claims of the disclosure, any one of the examples set forth thereby can be used in any combination.

Heretofore, the technical solutions of the disclosure have been described in conjunction with the preferred embodiments shown in the drawings, however, those skilled in the art can readily understand that the scope of protection of the disclosure is obviously not limited to these specific embodiments. Those skilled in the art could make equivalent changes or substitutions to the related technical features without departing from the principles of the disclosure, and all the technical solutions after the changes or the substitutions fall within the scope of protection of the disclosure.

The invention claimed is:

1. A battery pack, comprising:
    a frame internally formed with an installation site;
    a battery module mounted in the installation site, and the battery module comprises a number of cells; and
    a side beam connected to an outer side wall of the frame and made of a first thermal insulation material,
    wherein the outer side wall of the frame is provided with a lug for connecting to a vehicle, an interior of the side beam is formed with an enveloping chamber opening toward the frame, and the lug is accommodated in the enveloping chamber in a connected state.

2. The battery pack according to claim 1, wherein the first thermal insulation material is a microcellular expanded composite material.

3. The battery pack according to claim 2, wherein the microcellular expanded composite material is microcellular expanded polypropylene or microcellular expanded nylon.

4. The battery pack according to claim 1, wherein there are two side beams, which are connected to two side walls of the frame respectively in a length direction of the frame.

5. The battery pack according to claim 1, wherein the interior of the side beam is filled with an energy-absorbing material.

6. The battery pack according to claim 5, wherein the interior of the side beam is formed with a plurality of rib plates, which divide the interior of the side beam into a plurality of installation chambers opening toward the frame, and the energy-absorbing material is filled in the plurality of installation chambers.

7. The battery pack according to claim 5, wherein the energy-absorbing material is expanded polypropylene or ethylene-vinyl acetate copolymer.

8. The battery pack according to claim 1, wherein the outer side wall of the frame is formed with a plurality of reinforcing ribs, a plurality of filling spaces are formed between the plurality of reinforcing ribs, and each of the filling space is filled with a second thermal insulation material.

9. The battery pack according to claim 8, wherein the second thermal insulation material is an expanded thermal insulation material.

10. The battery pack according to claim 9, wherein the expanded thermal insulation material is silicone foam, polyurethane sponge or polyvinyl chloride expanded plastic.

11. The battery pack according to claim 1, wherein the frame is a hollow structure and is formed with a cavity, and the cavity is filled with a phase-change material.

12. The battery pack according to claim 11, wherein the phase-change material is an inorganic phase-change material, an organic phase-change material or a composite phase-change material.

13. The battery pack according to claim 1, wherein the battery pack further comprises an active thermal compensation assembly, which is provided on a heat dissipation path of the battery module and is configured to be able to heat the cells.

14. The battery pack according to claim 13, wherein the active thermal compensation assembly is connected to a battery management system.

15. The battery pack according to claim 13, wherein the frame comprises an outer frame and an inner frame, the plurality of installation sites are formed in an enclosed manner between the outer frame and the inner frame, and the active thermal compensation assembly is provided on an inner side wall of the outer frame.

16. The battery pack according to claim 13, wherein the active thermal compensation assembly is an electric heater, a graphene heat radiation sheet or a thermoelectric cooler.

17. The battery pack according to claim 1, wherein the battery pack further comprises a temperature equalizing assembly, which is arranged in the frame and is configured to be able to balance the temperature between different cells.

18. The battery pack according to claim 17, wherein the temperature equalizing assembly is attached to the outer side wall of the battery module close to an outer periphery of the frame.

19. The battery pack according to claim 17, wherein the temperature equalizing assembly is a heat pipe group, a thermal conductive aluminum plate group or a thermal conductive silicon pad group.

* * * * *